(12) United States Patent
Roberts et al.

(10) Patent No.: US 10,584,824 B1
(45) Date of Patent: Mar. 10, 2020

(54) FOLDING BASE

(71) Applicants: Jeffrey A. Roberts, Apple Valley, MN (US); David M. Roberts, Saint Paul, MN (US)

(72) Inventors: Jeffrey A. Roberts, Apple Valley, MN (US); David M. Roberts, Saint Paul, MN (US)

(*) Notice: Subject to any disclaimer, the term of this patent is extended or adjusted under 35 U.S.C. 154(b) by 0 days.

(21) Appl. No.: 15/912,464

(22) Filed: Mar. 5, 2018

Related U.S. Application Data

(63) Continuation of application No. 14/517,765, filed on Oct. 17, 2014, now abandoned.

(60) Provisional application No. 61/892,434, filed on Oct. 17, 2013.

(51) Int. Cl.
| | |
|---|---|
| *F16M 11/32* | (2006.01) |
| *F16M 11/24* | (2006.01) |
| *H04R 1/08* | (2006.01) |
| *F16M 11/20* | (2006.01) |

(52) U.S. Cl.
CPC ....... *F16M 11/242* (2013.01); *F16M 11/2021* (2013.01); *H04R 1/08* (2013.01)

(58) Field of Classification Search
CPC .. F26M 11/242; F16M 11/245; F16M 11/247; F16M 11/242; F16M 11/2021; F16M 11/10; H04R 1/08

USPC ..................... 248/170, 166, 188.6
See application file for complete search history.

(56) References Cited

U.S. PATENT DOCUMENTS

| | | | | | |
|---|---|---|---|---|---|
| 2,613,901 | A | * | 10/1952 | Tatar ........................ | G10G 5/00 248/167 |
| 6,007,032 | A | * | 12/1999 | Kuo ....................... | F16M 11/10 248/125.1 |
| 6,084,549 | A | * | 7/2000 | Pensjo ................. | H01Q 1/1235 248/180.1 |
| 8,122,629 | B2 | * | 2/2012 | Cowgill .................. | G09F 17/00 248/166 |
| 2014/0059805 | A1 | * | 3/2014 | Krahn .................. | G06F 1/1681 16/342 |

* cited by examiner

*Primary Examiner* — Cassandra Davis
(74) *Attorney, Agent, or Firm* — Albert W. Watkins

(57) ABSTRACT

A folding base has a hinge body, and a stand emanates vertically from adjacent a center of the hinge body. A plurality of legs radiate from the hinge body and provide ground contact. Between and pivotally coupling each leg to the hinge body is one of a plurality of torque hinges, so that individual ones of the legs are rotationally coupled to the hinge body through a torque generating member. Preferably the torque required to pivot a leg with respect to the hinge body is greater than that generated solely by lifting a leg from the ground or supporting surface. The torque hinge may also be knurled to permit a secure and permanent press fit to the associated leg and the hinge body.

16 Claims, 4 Drawing Sheets

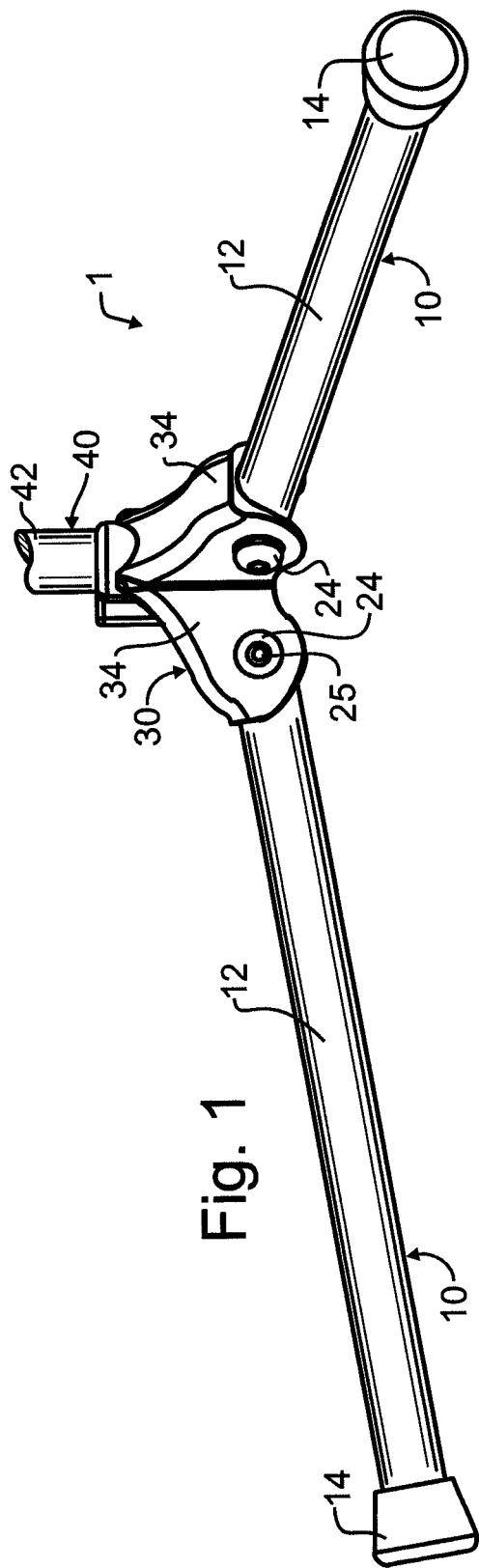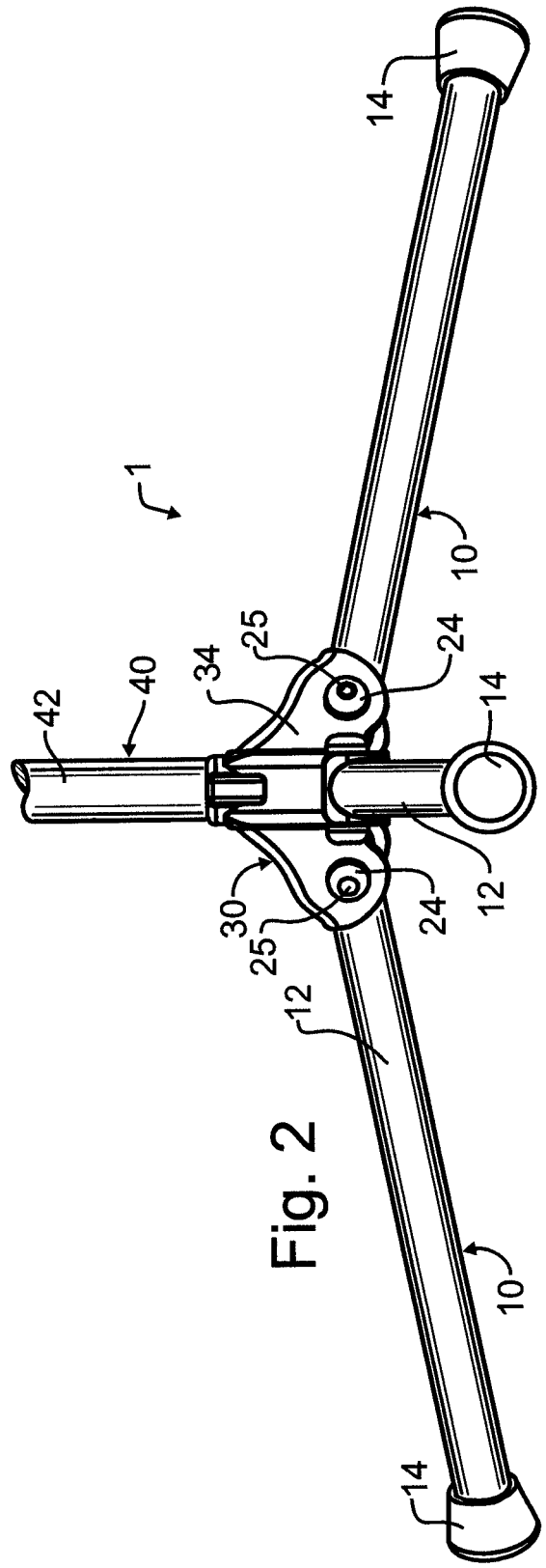

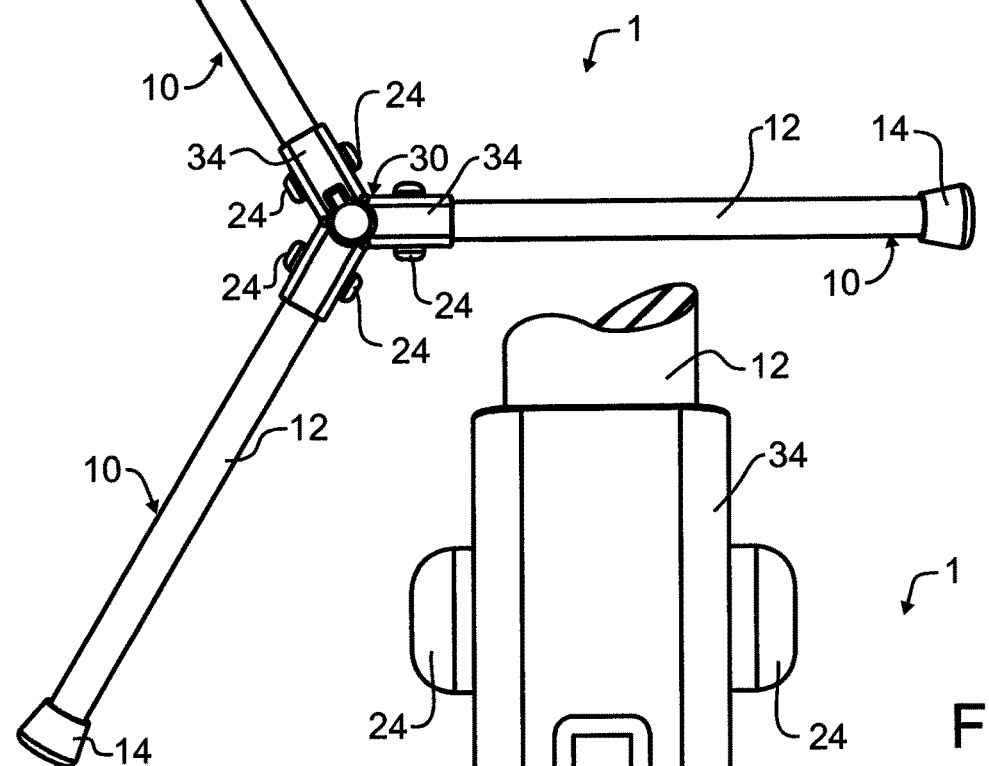
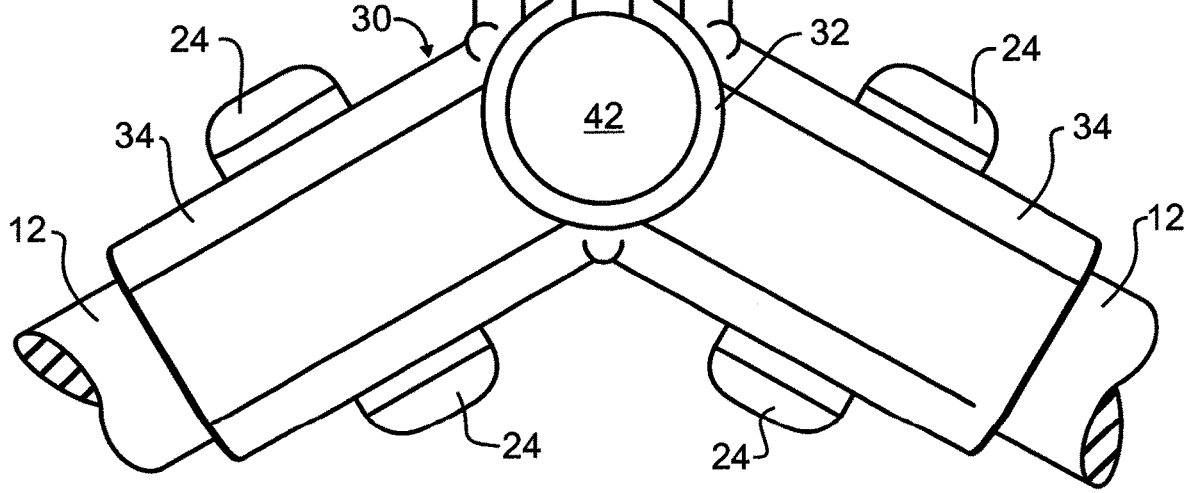

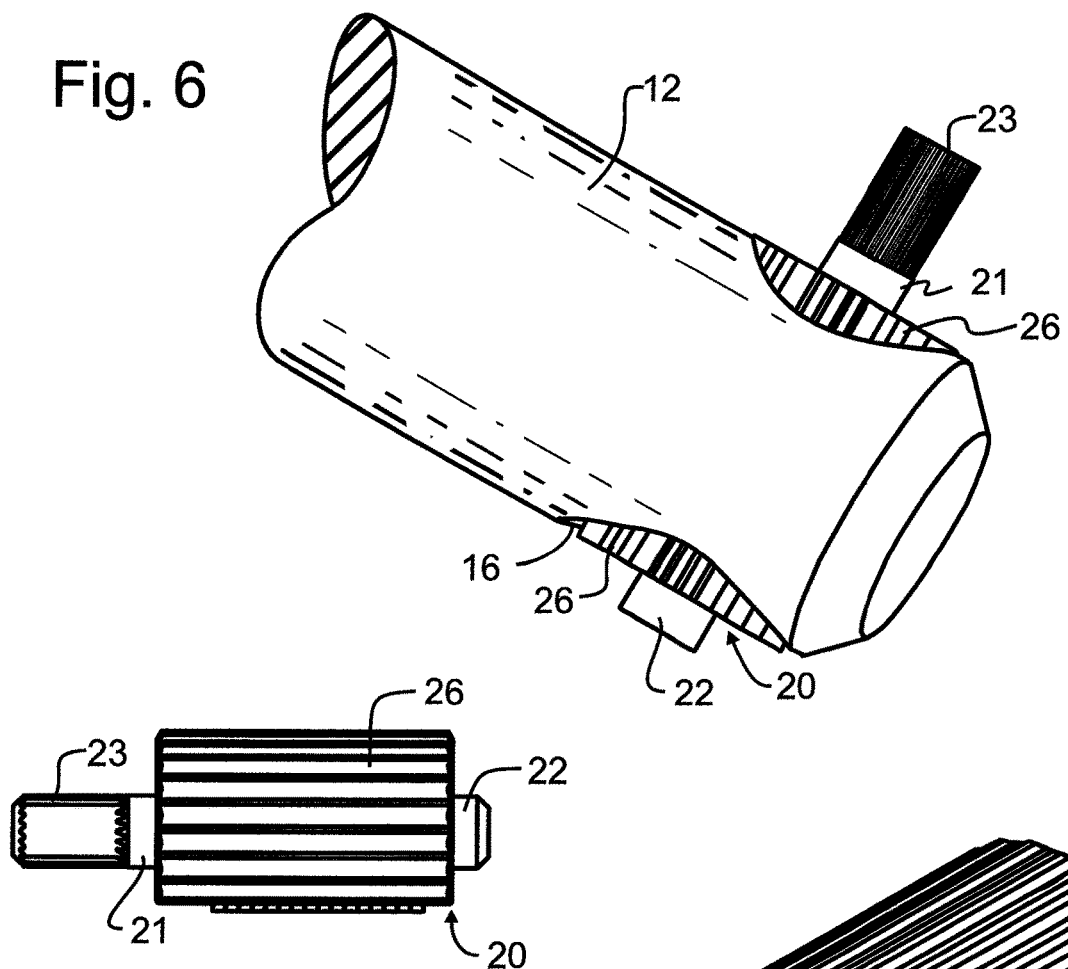
Fig. 6
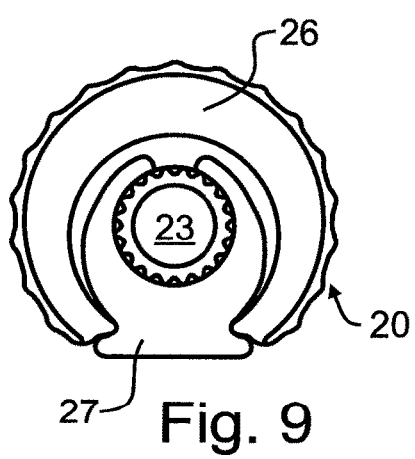
Fig. 7
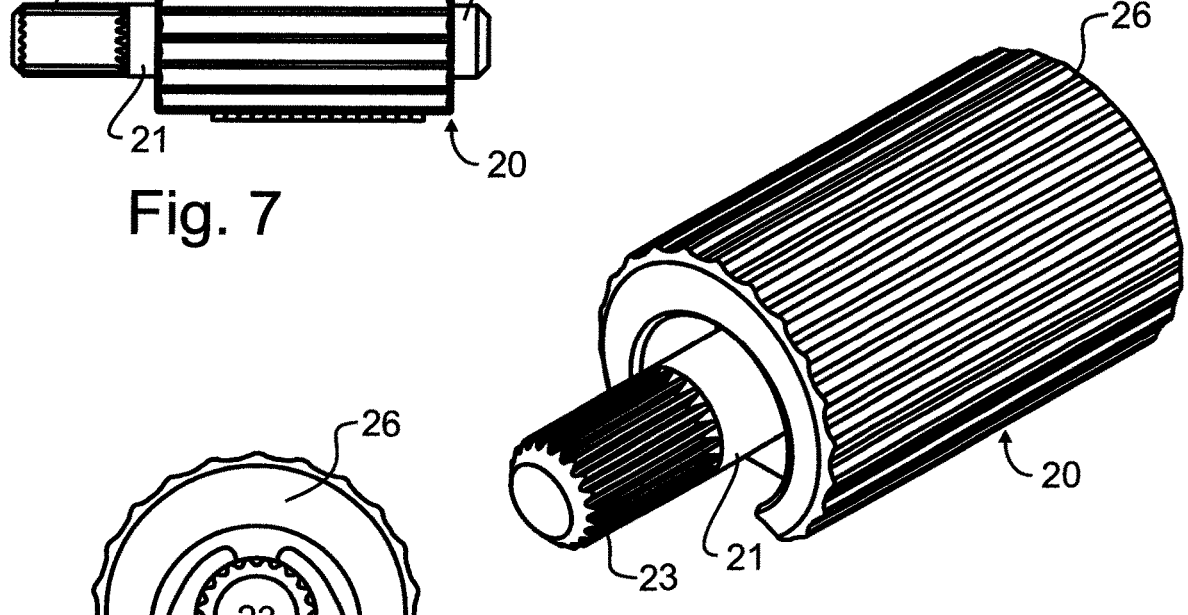
Fig. 8
Fig. 9

FOLDING BASE

CROSS REFERENCE TO RELATED APPLICATIONS

This application claims the benefit under 35 USC 119(e) of provisional 61/892,434 filed Oct. 17, 2013 and herewith, of like title and inventorship, the entire contents and teachings which are incorporated herein by reference.

BACKGROUND OF THE INVENTION

1. Field of the Invention

This invention pertains generally to supports, and more specifically to folding stands. In one preferred manifestation of the invention, the invention pertains to microphone stands, though the present invention is not solely limited thereto.

2. Description of the Related Art

Boom stands, which will be understood herein as vertically rising stands having at least one arm capable of extension in a horizontal direction, are used to support many diverse items. Lights, microphones, cameras, and many other electrical and non-electrical items too numerous to individually list herein are supported thereon. Most commonly, the item to be supported will preferably be easily relocated, as will the stand or at least the boom. This ability to provide relatively adjustable and easily relocated support is in great demand. Frequently, a plurality of these boom stands will be required, such as, for exemplary purposes but not limited thereto, in the case of a musical or theatrical performance where different performers or different parts of a stage are preferred to be either illuminated or coupled into an audio system.

Depending upon the particular item to be supported, the boom stand may have several requirements which must be met to perform satisfactorily. Among these, one common requirement is the ability to readily and rapidly reposition the boom, and then subsequent to the repositioning, anchor the boom into a new fixed position. This ability to readily and rapidly reposition the boom permits the stand to be placed at a convenient location along the ground or floor, without great care in the precise positioning. Once the base is located, then the boom arm may be moved into proper alignment. When any of the moving joints or connections are adjusted into new position, it is most desirable for the positions to be arrived at smoothly, and then locked into place without significant change of position during locking.

Since the boom may extend some distance from the base, it is generally desirable to incorporate significant mass into the base, to provide some measure of stability during movement or adjustment of the boom and subsequent thereto to best maintain the location of the boom. Unfortunately, in the prior art this often led to the use of a large and very massive base, typically of disc, slightly domed, or similar shape. Such a base is not readily transported, nor can it be used or stored in close arrangement with other bases. Consequently, it is not possible to tightly and compactly arrange, use or store a plurality of similar stands.

While the application for the boom stand will to some degree potentially affect the various dimensions and some of the configurations not only of the base, but of the stand as well, including such things as particular lengths or dimensions of the base and the boom, most desirably a boom stand will offer substantial flexibility in both application and physical arrangement and positioning. This flexibility is a desirable part of the benefits of such a stand, which is in part what separates such a stand from a fixture or anchored support.

A number of patents illustrate various stands and other content, the teachings and contents which are incorporated herein by reference: U.S. Pat. No. 1,593,415 by Perkins, entitled "Stand"; U.S. Pat. No. 1,721,690 by Daniele, entitled "Folding stand"; U.S. Pat. No. 1,780,039 by Pechan, entitled "Tripod head"; U.S. Pat. No. 1,863,756 by Lufkin, entitled "Portable stand"; U.S. Pat. No. 2,613,902 by Loken, entitled "Tripod leg connection"; U.S. Pat. No. 2,630,289 by Selig, entitled "Bass violin folding stand"; U.S. Pat. No. 2,634,075 by Mayzel, entitled "Stand"; U.S. Pat. No. 2,691,501 by Spencer, entitled "Tripod support"; U.S. Pat. No. 2,780,282 by Cox, Jr., entitled "Screen stand and case"; U.S. Pat. No. 2,873,079 by Carogana et al, entitled "Adjustable stand"; U.S. Pat. No. 3,180,602 by Monell, entitled "Adjustable conveyor stand"; U.S. Pat. No. 3,239,874 by Sperzel, entitled "Friction hinge"; U.S. Pat. No. 4,712,762 by Liedle, entitled "Adjustable reusable adapter system for temporary electric service"; U.S. Pat. No. 4,905,946 by Wang, entitled "Adjustable leg assembly"; U.S. Pat. No. 4,923,156 by Linneusson, entitled "Stand"; U.S. Pat. No. 5,060,894 by Hillinger, entitled "Stand with collapsible legs"; U.S. Pat. No. 5,082,222 by Hsu, entitled "Supporting device"; U.S. Pat. No. 5,102,079 by Lee, entitled "Connecting assembly for a tripod"; U.S. Pat. No. 5,124,857 by Pitz, entitled "Vehicular light monitoring apparatus"; U.S. Pat. No. 5,192,963 by Hill, entitled "Camera suspension apparatus"; U.S. Pat. No. 5,340,066 by Ditch, entitled "Stand for article"; U.S. Pat. No. 5,340,068 by Sarkisian et al, entitled "Release mechanism for locking pivotable leg"; U.S. Pat. No. 5,503,356 by Shelby, entitled "Folding target stand"; U.S. Pat. No. 5,638,579 by Tenney, entitled "Friction tilt mechanism"; U.S. Pat. No. 5,876,011 by Blasing, entitled "Utility stand having threaded adjusting apparatus"; U.S. Pat. No. 6,007,032 by Kuo, entitled "Foldable stand assembly for microphones"; U.S. Pat. No. 6,504,707 by Agata et al, entitled "Portable computer"; U.S. Pat. No. 7,048,241 by Crain et al, entitled "Geomatic support having hinged legs with hinge lock"; U.S. Pat. No. 7,147,191 by Ichikawa et al, entitled "Display tilting apparatus"; U.S. Pat. No. 7,240,881 by Crain et al, entitled "Geomatic support having hinged legs with hinge lock"; U.S. Pat. No. 7,514,619 by Bruce, entitled "Adjustable musician's stand"; U.S. Pat. No. 7,832,803 by Cassaday, entitled "Headrest linkage"; U.S. Pat. No. 8,152,402 by Wylde et al, entitled "Flexible peripheral device positioner"; 2007/0107580 by Vleugels, entitled "Frigtion torque capo"; and 2012/0170194 by Lord et al, entitled "Mobile computer stand".

Other patents illustrate various torque hinges and similar apparatus, the teachings and contents which are incorporated herein by reference: U.S. Pat. No. 3,357,041 by Brueder, entitled "Braking device for holding a pivot pin against motion"; U.S. Pat. No. 5,464,083 by Arnold et al, entitled "Torque limiting spring hinge"; U.S. Pat. No. 5,542,505 by Kempf, entitled "Torque limiting device with restraining mechanism"; U.S. Pat. No. 5,697,125 by Gannon, entitled "Clip friction hinge"; U.S. Pat. No. 5,771,539 by Wahlstedt et al, entitled "Torsion friction spring hinge"; U.S. Pat. No. 5,771,540 by Carpenter et al, entitled "Equilibrated hinge with variable frictional torque"; U.S. Pat. No. 5,787,549 by Soderlund, entitled "Torsion rod hinge with friction dampening"; U.S. Pat. No. 6,530,123 by Wahlstedt, entitled "Clip friction hinge with housing"; U.S. Pat. No. 8,523,476 by Billings, entitled "Positioning and damper device using shear force from cyclic differential compressive strain of a cross-linked thermoplastic"; 2007/0212162 by Schank et al, entitled "Shearing-force mechanism with cross-linked thermoplastic"; 2007/0234517 by Larson et al, entitled "Overmolded hinge with insert washer"; and 2007/0278050 by Larson et al, entitled "Toe position control". In addition to the foregoing patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is a folding base. The folding base has a hinge body, and a vertically extensive stand emanating vertically from adjacent a center of said hinge body. A plurality of legs radiate from the hinge body. At least one of the plurality of legs distal to the hinge body defines a surface contact point. At least one torque hinge pivotally couples the at least one of the plurality of legs to the hinge body.

In a second manifestation, the invention is a folding base having a plurality of legs radiating from a hinge body, and a plurality of torque hinges each coupled at a first member to the hinge body and coupled at a second member to an individual one of the plurality of legs, individual ones of the first member and second member rotationally coupled to each other through a torque generating member.

OBJECTS OF THE INVENTION

Exemplary embodiments of the present invention solve inadequacies of the prior art by providing a folding base having torque hinges that couple solid legs to a hinge body. The resulting folding base is adapted to support one or more of a variety of known devices thereon. More specifically, but not limited thereto, microphones, cameras, lights, medical equipment, and many other devices may be supported therefrom. The support of sensitive electrical or electronic equipment is most preferred, especially pertaining to microphones, but the application of the present invention is not solely limited thereto and is instead contemplated by the present inventors to have other applications as well.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide a folding base that is both cost effective and stable, while also being portable. A second object of the invention is to support higher weight loads than available in the prior art for a given base weight. Another object of the present invention is for the legs to lock when the torque applied thereto falls below static and dynamic thresholds. As a corollary thereto, it is an object of the invention to provide a stand that can be set vertically onto an irregular surface, or tilted to a desired angle, without any special instructions, tools, or techniques, and without any change in settings. As a further corollary thereto, it is an object of the invention that each leg stays in the open position when the stand is tilted, to maintain counterbalance and reduce the likelihood that the stand will tip. As a yet further corollary thereto, it is an object of the invention to provide a fixing force to keep stand legs folded when in a collapsed position for transport, to permit the stand to be carried while folded and not fly open. Yet another object of the present invention is to enables a simple central casting or forming for the hinge body that requires minimal machining, thereby keeping cost down and simplifying assembly.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIGS. 1-3 illustrate a preferred embodiment folding base designed in accord with the teachings of the present invention from front, side, and top views, respectively.

FIG. 4 illustrates an enlarged view of a preferred embodiment folding base hinge body used in the preferred embodiment folding base of FIGS. 1-3 from a top view.

FIG. 6 illustrates an enlarged view of a preferred embodiment torque hinge pressed into a hole drilled or otherwise formed through a solid leg, as used in the preferred embodiment folding base of FIGS. 1-5 from a top view.

FIGS. 7-9 illustrate a preferred embodiment torque hinge used in the preferred embodiment folding base of FIGS. 1-6 from front, projected and side views, respectively.

DESCRIPTION OF THE PREFERRED EMBODIMENT

Figure 5:
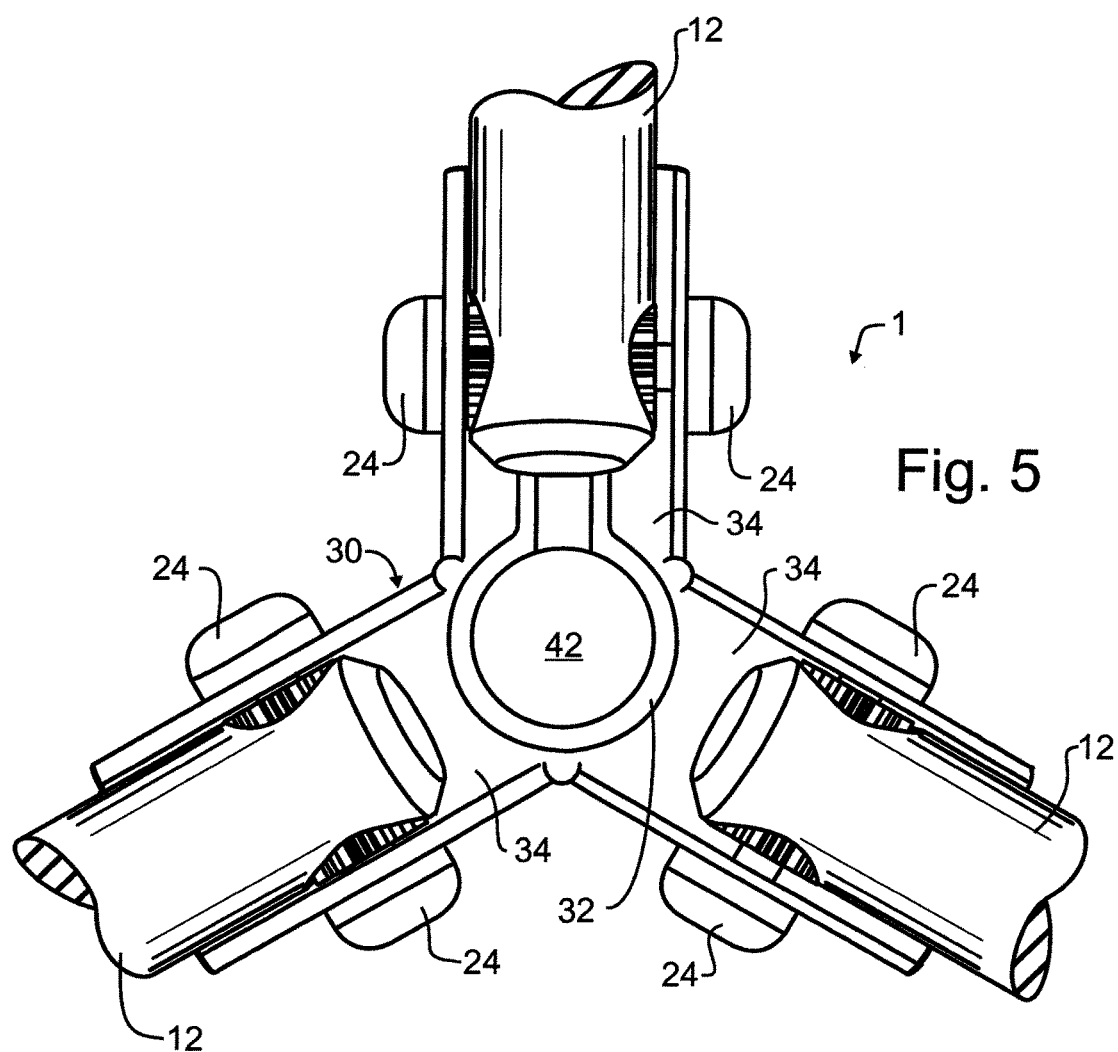
FIG. 5 illustrates the enlarged view of a preferred embodiment folding base hinge body of FIG. 4, but from a bottom view.

A preferred embodiment folding base 1 designed in accord with the teachings of the present invention is provided with a plurality of legs 10. While three legs 10 are illustrated in the preferred embodiment, thereby forming a tripod, it will be understood that the number of legs 10 provided will be determined by a designer. Three legs 10 are preferred, owing to fact that three contact points are the minimum number required for a stable support.

Each leg 10 is terminated at one end with a foot 14, with one ground or supporting floor or surface contact point or area defined by each foot 14. In the preferred embodiment, feet 14 are preferably elastomeric, manufactured from rubber or other resilient compounds, to provide a desired combination of vibration isolation between preferred embodiment folding base 1 and the supporting floor or surface, to serve as a soft, non-marring and protective terminus for leg 10, and also to provide some degree of friction there between to provide a more secure anchor. Nevertheless, these rubber or elastomeric feet 14 may be replaced with casters or wheels, which will permit the folding stand to be used in applications where a wheeled stand is preferred. Examples of diverse applications include but are not limited to IV stands, electronic equipment, or for other diverse use. With differently configured feet or for other intended purposes, either more or fewer legs 10 may be provided.

At an end distal to foot 14, each leg 10 is pivotally coupled to a centrally located hinge body 30. Hinge body 30, for exemplary purposes only and not solely limiting the invention thereto, might comprise a relatively simple cast or stamped metal. Hinge body 30 includes a central stand coupler 32 and a plurality of U-shaped or folded leg receivers 34. The number of U-shaped leg receivers 34 will match the number of legs 10 provided. For most but not all applications, it will be preferred that U-shaped leg receivers 34 and legs 10 radiate from hinge body 30 at equal or nearly equal angular increments, to ensure equal stability of preferred embodiment folding base 1 regardless of a direction that an unbalancing or potentially tipping force is applied.

In preferred embodiment folding base 1 as illustrated, U-shaped leg receivers 34 are open in a downward direction, and otherwise closed. This means that U-shaped leg receivers 34 cover the pivotal connection between legs 10 and hinge body 30 when in use, both concealing them from ordinary eyesight and also sheltering them from dust, debris and liquids that might be dropped or spilled thereupon. This also means that legs 10 will fold downward to a position parallel with elongate rod or tube 42, when legs 10 are collapsed. Furthermore, U-shaped leg receivers 34 will restrict the range of upward pivot of a leg 10 relative to hinge body 30. Nevertheless, it will be apparent that U-shaped receivers 34 might alternatively be flipped to be open in an upward direction, and if so then legs 10 would instead also fold upwards to the collapsed transport or storage position. Caps 24 may optionally be provided to cover and decorate the connections to hinge body 30, if so desired. If caps 24 are provided, then cap fasteners 25 may further be provided if desired.

Emanating vertically from the center of hinge body 30 is a vertically extensive stand 40, which will typically comprise an elongate rod or tube 42. The particular stand 40 is not critical to the present invention, and will be determined by a designer based upon the particular application for the present invention.

Each leg 10 may preferably comprise a solid metal rod referred to herein generally as leg member 12, which provides strength and sufficient mass to improve the stability of preferred embodiment folding base 1. However, from a reading of the present disclosure those skilled in the mechanical arts will recognize that various alternative techniques for weighting may be used. For exemplary purposes, and not solely limiting the invention thereto, the addition or use of particularly dense materials such as lead or brass in leg 10, preferably more distal to hinge body 30, may provide enough mass to allow leg members 12 to be tubular or of other suitable geometry. There may also be particular applications where less mass is required, such as when vertically extensive stand 40 is quite short relative to the length of legs 10, or when there is a very light or low-torque load carried upon vertically extensive stand 40. Leg members 12 are illustrated as being rod-shaped, but the particular geometry of leg members 12 or the geometric shape of their cross-section is not so limited, and they may take any suitable geometry.

FIGS. 4 and 5 illustrate preferred embodiment folding base hinge body 30, with leg members 12 emanating therefrom. In the center of hinge body 30 there is provided a central stand coupler 32 of any suitable geometry and operation which will be used to couple with an elongate rod or tube 42 that forms a part of vertically extensive stand 40. A plurality of U-shaped leg receivers 34 are provided around central stand coupler 32, each one of which preferably receives a leg 10.

Visible in FIG. 5 are torque hinges 20 that each provide pivotal coupling between one leg 10 and one U-shaped leg receiver 34. The operation of torque hinges 20 is similar to that illustrated in various ones of the torque hinge patents incorporated herein above by reference. Essentially, a torque hinge shaft 21 may only be rotated with respect to a torque hinge housing 26 when sufficient torque is applied there between.

Each individual one of torque hinges 20 is rigidly coupled through torque hinge housing 26 to a bore or hole 16 formed in a leg 10. Likewise, torque hinge shaft 21 extending from torque hinge housing 26 is rigidly coupled to U-shaped leg receiver 34. If desired, caps 24 and cap fasteners 25 such as socket head screws may be provided as well.

FIGS. 7-9 illustrates the preferred embodiment torque hinge 20 used in the preferred embodiment folding base 1 of FIGS. 1-6. A preferred torque hinge 20 may include clips 27 such as are visible in FIG. 9 to create a controlled and predictable torque required to move shaft 21 relative to housing 26. This is known in the art of torque hinges, and illustrated for exemplary purposes in US published patent application 2007/0234517 and U.S. Pat. No. 6,530,123, each owned by Reell Precision Manufacturing Corporation of St. Paul, Minn. The particular hinge illustrated herein is commercially available from Reell Precision Manufacturing Corporation.

While prior art torque hinges illustrate the general concept of a torque hinge, a preferred embodiment torque hinge 20 used in accord with the teachings of the present invention has several unique characteristics. The first is a high static and dynamic torque required to generate motion between torque hinge shaft 21 and torque hinge housing 26. In preferred embodiment folding base 1, for exemplary and non-limiting purposes, this is 5 NM (Newton-Meters) of torque. A preferred torque hinge 20 will also be denoted as symmetric, meaning the torque threshold required to initiate rotation is independent of direction of rotation, though both the amount of torque and the symmetry of the torque required may be varied at the time of design. Most preferably, the torque required to pivot a leg 10 with respect to hinge body 30 will be greater than that generated solely by lifting foot 14 from the ground or supporting surface. This ensures that leg 10 remains locked in an extended position, meaning that tilting of stand 40 requires lifting the entire weight of leg 10. Noteworthy is that many prior art torque hinges do not offer this level of torque. Furthermore, many prior art portable weighted bases only lift the leg adjacent to the base, allowing the leg to pivot with respect to the base. This means that for these prior art bases, only approximately one-half of the weight of the leg needs to be lifted for the stand to tilt. In contrast, to tilt preferred embodiment folding base 1, an entire leg 10 must be lifted.

Most preferably, torque hinge shaft 21 is affixed rigidly with U-shaped leg receiver 34. This may, for exemplary purposes, be achieved by pressing, deforming, welding, adhesively bonding, or otherwise fastening the two together. Torque hinge caps 24 can include fasteners such as socket head screws to assist in this attachment, though as noted, any suitable means may be provided and a screw-free attachment is most preferred.

A second unique characteristic of preferred embodiment torque hinge 20 is the extension of shaft 21. In order to enable press-fit attachment, preferred embodiment torque hinge 20 such as illustrated in FIGS. 7-9 will preferably have a shaft 21 that extends at both ends beyond torque hinge housing 26 so that both ends 22, 23 are accessible beyond housing 26. The use of a metal composition for the fabrication of hinge bodies 30 and shaft 21 permits one or both of ends 22, 23 to be provided with knurls that may then be press-fit into U-shaped leg receiver 34 at the time of manufacture. This facilitates rigid affixing of shaft 21 to hinge body U-shaped leg receiver 34 that wraps about the distal shaft ends 22, 23.

Torque hinge housing 26 is most preferably also knurled, and is dimensioned to be pressed into a hole 16 formed in leg 10, such as illustrated in FIG. 6. Hole 16 may for exemplary purposes be drilled, but may otherwise be formed through each leg 10. To achieve a desirable stability in the preferred embodiment folding base 1, legs 10 will preferably be of significant mass. This is achieved by the combination of being solid, and also preferably by the use of materials that are both sturdy and dense. In the preferred embodiment, this is achieved using a suitable metal rod. Selection of a suitable material for the housing of the torque hinge will ensure appropriate and potentially permanent deformation of either torque hinge housing 26 or hole 16 in leg 10, or both. Most preferably, this deformation will be sufficiently strong to withstand all forces that the preferred embodiment folding base will encounter, sot that in operation each torque hinge housing 26 stays secured within hole 16 in the associated leg 10.

Preferred embodiment folding base 1 is both cost effective and stable, while also offering portability. As a result of the combination of features of preferred embodiment folding base 1, very high weight loads can be supported. Furthermore, the use of the preferred torque hinge 20 allows legs 10 to lock when the torque applied thereto falls below the static and dynamic thresholds. No further action is required by a person setting up preferred embodiment folding base 1, other than pushing on legs 10 to set them in a desired position. This is extremely beneficial, since preferred embodiment folding base 1 can be set up on an irregular surface and readily manually aligned vertically, or if desired manually tilted to a desired angle therefrom, without any special instructions or techniques and without any change in settings.

In operation, it is very important for each leg 10 to stay in the open position when vertically extensive stand 40 is tilted, to maintain counterbalance using the full weight of leg 10 to help prevent preferred embodiment folding base 1 from tipping. If a leg 10 were to drop when stand 40 is tilting, substantial counterbalance is lost and preferred embodiment folding base 1 would be more likely to fall over.

Owing to the continuous and symmetric nature of preferred torque hinge 20 and the high torque required for rotation, folded legs 10 will not drop when preferred embodiment folding base 1 is transported in a collapsed position. This means that preferred embodiment folding base 1 can be carried while legs 10 are folded, and legs 10 will not fly open. Further, preferred torque hinge 20 enables a simple central casting or forming of hinge body 30 that requires minimal machining, thereby keeping cost down. Assembly is a matter of pressing parts together. No screws or tapped holes are required.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

We claim:

1. A folding base, comprising:
   a hinge body having at least one U-shaped leg receiver;
   a vertically extensive stand emanating vertically from adjacent a center of said hinge body;
   a plurality of weighted legs radiating from said hinge body;
   at least one of said plurality of weighted legs having a surface contact point, said surface contact point located distally to said hinge body; and
   at least one torque hinge having a housing rigidly affixed to said at least one of said plurality of weighted legs and having a shaft pivotally passing through said housing and extending at each distal longitudinal end beyond said torque hinge housing and rigidly affixed at each distal longitudinal end to said at least one U-shaped leg receiver, said at least one torque hinge pivotally coupling said at least one of said plurality of weighted legs to said hinge body U-shaped receiver, said at least one torque hinge configured such that a torque required to pivot said at least one of said plurality of weighted legs relative to said hinge body is greater than a torque generated by a weight of said at least one of said plurality of weighted legs, whereby said at least one of said plurality of weighted legs remains locked in an extended position when said surface contact point is separated from a surface on which said folding base rests.

2. The folding base of claim 1, wherein said surface contact point further comprises an elastomeric foot.

3. The folding base of claim 1, wherein said plurality of weighted legs radiate from a circumference of said hinge body at substantially equal angular increments.

4. The folding base of claim 1, wherein said at least one U-shaped leg receiver further restricts a range of upward pivot of said at least one of said plurality of weighted legs relative to said hinge body.

5. The folding base of claim 4, wherein said at least one U-shaped leg receiver further comprises an opening in a downward direction and is otherwise closed.

6. The folding base of claim 1, wherein said at least one torque hinge housing further comprises a knurled housing and said at least one of said plurality of weighted legs further comprises a bore, said torque hinge knurled housing rigidly coupled to said bore.

7. The folding base of claim 6, wherein said at least one torque hinge shaft further comprises a knurled torque hinge shaft extending from said torque hinge housing and rigidly coupled to said hinge body.

8. The folding base of claim 6, wherein said at least one of said plurality of weighted legs further comprises a solid metal leg.

9. A folding base, comprising:
   a hinge body having a plurality of U-shaped receivers;
   a plurality of legs radiating from said hinge body;
   a plurality of torque hinges, each individual one of said plurality of torque hinges having a shaft member and a housing member rotationally coupled to said shaft member, each individual one of said plurality of torque hinges coupled at each distal end of said shaft member to said hinge body and coupled at said housing member to an individual one of said plurality of legs;
   each one of said plurality of torque hinges thereby adapted to pivotally couple a one of said plurality of legs to a one of said hinge body U-shaped receivers, such that a torque required to pivot said one of said plurality of legs relative to said hinge body is greater than a torque generated by a weight of said one of said plurality of legs, whereby said one of said plurality of legs remains locked in an extended position when said leg is suspended above a surface solely by a one of said plurality of torque hinges.

10. The folding base of claim 9, wherein said plurality of legs radiate from a circumference of said hinge body at substantially equal angular increments.

11. The folding base of claim 9, further comprising a vertically extensive stand emanating vertically in a generally upward direction from said hinge body; and wherein said hinge body further comprises a plurality of U-shaped leg receivers that are open in a generally downward direction, and are otherwise closed.

12. The folding base of claim 9, wherein said one of said plurality of legs is weighted.

13. The folding base of claim 12, wherein said one of said plurality of weighted legs further comprises a solid metal leg.

14. A folding microphone boom stand configured to fold into a first collapsed position and unfold from said first collapsed position to a second operative supporting position, said folding microphone boom stand comprising:

a hinge body having a plurality of U-shaped leg receivers;

a plurality of weighted legs radiating from said hinge body, each individual one of said plurality of weighted legs distal to said hinge body defining a surface contact point;

a plurality of torque hinges, each one of said plurality of torque hinges having a housing rigidly affixed to a one of said plurality of weighted legs and having a shaft passing through and rotationally coupled with said housing, said shaft extending at each distal longitudinal end beyond said torque hinge housing and rigidly affixed at each distal longitudinal end to a one of said plurality of U-shaped leg receivers and pivotally coupling said one of said plurality of weighted legs to said one of said plurality of U-shaped leg receivers and configured such that a torque required to pivot said shaft relative to said housing is greater than a torque generated by a weight of said one of said plurality of weighted legs, whereby said one of said plurality of weighted legs remains locked in an extended position when said surface contact point is separated from a surface on which said folding microphone boom stand rests; and a vertically extensive stand emanating vertically from adjacent a center of said hinge body and configured to support a microphone boom and microphone therefrom.

15. The folding microphone boom stand of claim 14, wherein said one of said plurality of U-shaped leg receivers further restricts a range of upward pivot of said one of said plurality of weighted legs relative to said hinge body.

16. The folding microphone boom stand of claim 14, wherein said plurality of weighted legs further comprises a plurality of solid metal legs.

* * * * *